US012763999B2

United States Patent
Huang et al.

(12) United States Patent
(10) Patent No.: US 12,763,999 B2
(45) Date of Patent: Oct. 13, 2026

(54) ENCODING METHOD, DECODING METHOD, ENCODING CIRCUIT AND DECODING CIRCUIT FOR SINGLE-CHANNEL COMMUNICATION

(71) Applicant: SUZHOU NOVOSENSE MICROELECTRONICS CO., LTD., Suzhou (CN)

(72) Inventors: Jiageng Huang, Suzhou (CN); Yun Sheng, Suzhou (CN); Jianfeng Lin, Suzhou (CN)

(73) Assignee: SUZHOU NOVOSENSE MICROELECTRONICS CO., LTD., Suzhou (CN)

( * ) Notice: Subject to any disclaimer, the term of this patent is extended or adjusted under 35 U.S.C. 154(b) by 108 days.

(21) Appl. No.: 18/700,519

(22) PCT Filed: Mar. 15, 2022

(86) PCT No.: PCT/CN2022/080838

§ 371 (c)(1),
(2) Date: Sep. 30, 2024

(87) PCT Pub. No.: WO2023/060834

PCT Pub. Date: Apr. 20, 2023

(65) Prior Publication Data

US 2025/0016033 A1 Jan. 9, 2025

(30) Foreign Application Priority Data

Oct. 15, 2021 (CN) .......................... 202111200511.4

(51) Int. Cl.

| | |
|---|---|
| ***H03K 9/08*** | (2006.01) |
| ***H04L 7/00*** | (2006.01) |
| ***H04L 25/49*** | (2006.01) |

(52) U.S. Cl.

CPC ........ *H04L 25/4902* (2013.01); *H04L 7/0037* (2013.01); *H04L 25/4917* (2013.01)

(58) Field of Classification Search

CPC ...... H03K 7/08; H03K 5/133; H04L 25/4902; H04L 2027/0036; H04L 2027/0067; H04L 1/0061; H04B 10/508; H04B 10/50577

(Continued)

(56) References Cited

U.S. PATENT DOCUMENTS

| | | | | |
|---|---|---|---|---|
| 4,951,049 A * | 8/1990 | Whitfield | H03M 5/12 | 360/44 |
| 4,984,255 A * | 1/1991 | Davis | H04L 7/033 | 331/25 |

(Continued)

FOREIGN PATENT DOCUMENTS

| | | |
|---|---|---|
| CN | 101247128 A | 8/2008 |
| CN | 101594186 A | 12/2009 |

(Continued)

OTHER PUBLICATIONS

The International Search Report (PCT/ISA/210) issued in PCT/CN2022/080838, dated Jun. 21, 2022.

*Primary Examiner* — Khai Tran

(74) *Attorney, Agent, or Firm* — Birch, Stewart, Kolasch & Birch, LLP

(57) ABSTRACT

The present invention relates to an encoding method, a decoding method, an encoding circuit and a decoding circuit for single-channel communication. The encoding method for single-channel communication comprises: combining a clock signal and a data signal to a long- and short-code signal, wherein the long- and short-code signal comprises a long-code signal and a short-code signal, a pulse width of the long-code signal is consistent with that of the clock signal, and a pulse width of the short-code signal is consis- (Continued)

tent with that of the clock signal; and the long-code signal and the short-code signal have different duty cycles. According to the encoding method, the clock signal and the data signal are encoded at the same time, which can reduce the circuit complexity and thus the wire bonding for chip packaging.

20 Claims, 10 Drawing Sheets

(58) Field of Classification Search
USPC .......................................................... 375/238
See application file for complete search history.

(56) References Cited

U.S. PATENT DOCUMENTS

| | | | | |
|---|---|---|---|---|
| 5,023,891 | A | 6/1991 | Johnson, III | |
| 5,046,073 | A * | 9/1991 | Sexton | H04L 27/156 375/333 |
| 5,550,864 | A * | 8/1996 | Toy | H04L 25/4904 375/293 |
| 5,619,541 | A | 4/1997 | Van Brunt et al. | |
| 6,518,809 | B1 | 2/2003 | Kotra | |
| 8,929,467 | B1 | 1/2015 | Xiu | |
| 2005/0007168 | A1 * | 1/2005 | Park | H03K 5/1565 327/175 |
| 2008/0195894 | A1 | 8/2008 | Schreck et al. | |
| 2009/0207707 | A1 | 8/2009 | McCormack | |
| 2013/0314126 | A1 | 11/2013 | Garrity | |

FOREIGN PATENT DOCUMENTS

| | | | |
|---|---|---|---|
| CN | 101694991 | A | 4/2010 |
| CN | 102035514 | A | 4/2011 |
| CN | 107276955 | A | 10/2017 |
| CN | 108123714 | A | 6/2018 |
| CN | 108988868 | A | 12/2018 |
| CN | 109088623 | A | 12/2018 |
| CN | 113645007 | B | 4/2022 |
| CN | 114760011 | B | 10/2023 |
| EP | 1 335 495 | A2 | 8/2003 |
| JP | 56-164654 | A | 12/1981 |
| JP | 2008-99228 | A | 4/2008 |
| JP | 2011-77791 | A | 4/2011 |
| JP | 2018-506915 | A | 3/2018 |
| KR | 10-2020-0121522 | A | 10/2020 |

* cited by examiner

ENCODING METHOD, DECODING METHOD, ENCODING CIRCUIT AND DECODING CIRCUIT FOR SINGLE-CHANNEL COMMUNICATION

CROSS-REFERENCE TO RELATED APPLICATION

This application claims priority to Chinese Patent Application No. 202111200511.4, filed on Oct. 15, 2021 and entitled "ENCODING METHOD, DECODING METHOD, ENCODING CIRCUIT AND DECODING CIRCUIT FOR SINGLE-CHANNEL COMMUNICATION", which is incorporated herein by reference in its entirety.

TECHNICAL FIELD

The present invention belongs to the field of analog-digital hybrid circuits, and in particular, relates to an encoding method, a decoding method, an encoding circuit and a decoding circuit for single-channel communication.

BACKGROUND

A digital isolator is intended for communication, and includes a primary side and a secondary side for receiving signals sent by the primary side.

FIG. 1 is a common mode of isolated transmission for data and clock, in which, for the data and clock on the primary side, signals are respectively transmitted to the isolated secondary side by using an isolated channel. In this mode, two isolated channels are occupied, leading to high power consumption during operation and high wafer cost; and moreover, more bonding wires are required for chip packaging, resulting in high packaging cost.

FIG. 2 is a single-channel isolated communication based on a clock-data recovery technology, in which a data signal synchronized with a clock from the primary side is sent in a serial mode to the isolated secondary side by means of a transmitter, the secondary side extracts the clock from the received data signal by means of a clock-data recovery circuit, and then re-samples the data by using the extracted clock and finally acquires the recovered clock and data signals.

FIG. 3 is a common clock-data recovery circuit and timing based on a phase-locked loop circuit.

The circuits shown in FIG. 2 and FIG. 3 have the following technical disadvantages: (1) a long string of "0" or "1" signals cannot be communicated; (2) the data code rate and phase of the transmitted signal are deviated from the frequency and phase of a voltage-controlled oscillator in the clock-data recovery circuit at a receiving terminal, and it takes a longer time to complete the lock of the frequency and phase, such that it takes a longer time to establish communication; and (3) the clock-data recovery circuit needs to lock the frequency first and then lock the phase, resulting in more control loops, higher design complexity, and higher implementation cost.

SUMMARY

Objects of the present invention are to design a method for efficient communication, which can encode a clock signal and a data signal at the same time, thereby reducing circuit complexity and thus the wire bonding for chip packaging.

In order to achieve one of the above objects of the present invention, an embodiment of the present invention provides an encoding method for single-channel communication, comprising: combining a clock signal and a data signal into a long- and short-code signal, wherein the long- and short-code signal comprises a long-code signal and a short-code signal, a pulse width of the long-code signal is consistent with that of the clock signal, and a pulse width of the short-code signal is consistent with that of the clock signal; and the long-code signal and the short-code signal have different duty cycles.

As a further improvement on an embodiment of the present invention, a duty cycle of a long- and short-code signal satisfies a following relational expression: Tclk=TS+TL, wherein Tclk indicates a clock period, TS indicates a high-level time of the short-code signal, TL indicates a high-level time of the long-code signal, and TS is not equal to TL.

As a further improvement on an embodiment of the present invention, combining the clock signal and the data signal into the long- and short-code signal comprises: generating a first delay clock signal based on the clock signal; generating a pulse signal based on the first delay clock signal; generating a high level of the long-code signal and a high level of the short-code signal based on the pulse signal; generating a second delay clock signal based on the first delay clock signal; generating a low level of the short-code signal based on the second delay clock signal; generating a low level of the long-code signal based on the clock signal; generating a data delay signal based on the first delay clock signal and the data signal; and selecting the long-code signal or the short-code signal based on the data signal and generating the long- and short-code signal.

As a further improvement on an embodiment of the present invention, a delay time of the first delay clock signal relative to the clock signal is TS; a delay time of the second delay clock signal relative to the first delay clock signal is TS; and a delay time of the data delay signal relative to the data signal is TS.

As a further improvement on an embodiment of the present invention, combining the clock signal and the data signal into the long- and short-code signal comprises: generating a first pulse signal based on the clock signal; generating a first delay clock signal based on the clock signal; generating a second delay clock signal based on the first delay clock signal; generating a second pulse signal based on the second delay clock signal; generating a third pulse signal based on the first delay clock signal; generating a high level of the long-code signal or a high level of the short-code signal based on the third pulse signal; generating a data delay signal based on the data signal and the first delay clock signal; selecting the first pulse signal or the second pulse signal based on the data delay signal; generating a low level of the short-code signal based on the selected second pulse signal; and generating a low level of the long-code signal based on the selected first pulse signal.

In order to achieve one of the above objects of the present invention, an embodiment of the present invention provides an encoding circuit for single-channel communication, comprising: a first delay circuit configured to generate a first delay clock signal based on a clock signal; a pulse generator configured to generate a pulse signal based on the first delay clock signal; a long-code flip-flop, which has a reset terminal for receiving the pulse signal and outputting a high level of a long-code signal, and has a clock terminal for receiving the clock signal, the clock signal triggering an output of a low level of a long-code signal; a short-code flip-flop, which has a reset terminal for receiving the pulse signal and outputting a high level of a short-code signal; a second delay circuit configured to generate a second delay clock signal based on the first delay clock signal, a clock terminal of the short-code flip-flop for receiving the second delay clock signal and outputting a low level of the short-code signal; a selection flip-flop, which has a clock terminal for receiving the first delay clock signal, a data terminal coupled to a data signal, and an output terminal for outputting a data delay signal; and a data selector, which has a first input terminal coupled to an output terminal of the long-code flip-flop, a second input terminal coupled to an output terminal of the short-code flip-flop, and a selection terminal coupled to the output terminal of the selection flip-flop, the data selector selecting and outputting the long-code signal or the short-code signal based on the data delay signal to form a long- and short-code signal.

In order to achieve one of the above objects of the present invention, an embodiment of the present invention provides an encoding circuit for single-channel communication, comprising: a first delay circuit configured to generate a first delay clock signal based on a clock signal; a second delay circuit configured to generate a second delay clock signal based on the first delay clock signal; a first pulse generator configured to generate a first pulse signal based on the first delay clock signal; a second pulse generator configured to generate a second pulse signal based on the second delay clock signal; a third pulse generator configured to generate a third pulse signal based on the first delay clock signal; a selection flip-flop, which has a clock terminal for receiving the first delay clock signal, a data terminal coupled to a data signal, and an output terminal for outputting a data delay signal; a data selector, which has a first input terminal coupled to the first pulse generator, a second input terminal coupled to the second pulse generator, and a selection terminal coupled to the data delay signal and selecting the first pulse signal or the second pulse signal based on the data delay signal; and an output flip-flop, which has a reset terminal coupled to the third pulse generator, and a clock terminal coupled to an output terminal of the data selector, wherein the output flip-flop generates a high level of a long-code signal or a high level of a short-code signal based on the third pulse signal, the clock terminal receives the first pulse signal and generates a low level of the long-code signal, and the clock terminal receives the second pulse signal and generates a low level of the short-code signal.

In order to achieve one of the above objects of the present invention, an embodiment of the present invention provides a decoding method for single-channel communication, comprising: generating a low level of a clock signal based on a high level of a long- and short-code signal; generating a delay pulse signal based on the long- and short-code signal, a delay time length of the delay pulse signal being a half of a clock period; generating a high level of the clock signal based on the delay pulse signal; and generating a digital signal based on the clock signal and the long- and short-code signal.

As a further improvement on an embodiment of the present invention, generating the delay pulse signal based on the long- and short-code signal further comprises: generating a long- and short-code delay signal based on the long- and short-code signal, and controlling a delay time of the long- and short-code signal based on a phase difference between the long- and short-code delay signal and the long- and short-code signal.

As a further improvement on an embodiment of the present invention, controlling the delay time of the long- and short-code signal based on the phase difference between the long- and short-code delay signal and the long- and short-code signal further comprises: converting a signal of the phase difference to a voltage signal, and controlling the delay time of the long- and short-code delay signal based on the voltage signal.

In order to achieve one of the above objects of the present invention, an embodiment of the present invention provides a decoding circuit for single-channel communication, comprising: a delay pulse circuit configured to delay a long- and short-code signal by half a clock period and generate a long- and short-code delay signal; a pulse generator configured to generate a delay pulse signal based on the long- and short-code delay signal; a clock flip-flop, which has a clock terminal coupled to the long- and short-code signal and generating a low level of a clock signal based on the long- and short-code signal, and a reset terminal coupled to an output terminal of the pulse generator, the clock flip-flop generating a high level of the clock signal based on the delay pulse signal; and a digital signal flip-flop, which has a clock terminal coupled to an output terminal of the clock flip-flop, and a data terminal coupled to the long- and short-code signal, the digital signal flip-flop generating a digital high level or a digital low level based on the clock signal.

As a further improvement on an embodiment of the present invention, the delay pulse circuit comprises a delay circuit and a pulse circuit, wherein the delay circuit comprises: an intermediate stage of the delay circuit for converting the long- and short-code signal to the long- and short-code delay signal; a phase-frequency detector configured to detect a phase difference between the long- and short-code delay signal and the long- and short-code signal; a charge pump configured to convert the phase difference to a current signal; and a low-pass filter configured to convert the current signal to a voltage signal, wherein the intermediate stage of the delay circuit is coupled to the low-pass filter, and configured to receive the voltage signal and control a delay time of the long- and short-code delay signal.

As a further improvement on an embodiment of the present invention, the decoding circuit further comprises a flip detector, an oscillator, and a data selector, wherein when no communication occurs, the flip detector outputs a low level, and the data selector couples an output of the oscillator to a delay-locked loop, and establishes a voltage signal; and when communication occurs, the flip detector outputs a high level, and the data selector couples the long- and short-code signal to the delay pulse circuit.

Compared with the prior art, the present invention has at least the following beneficial technical effects: (1) a long- and short-code encoding scheme is used to fuse a data signal and a clock signal for communication, so that higher efficiency and lower power consumption are achieved; (2) the single-channel communication is enabled, such that wire bonding for chip packaging can be reduced, thereby reducing the chip manufacturing cost; (3) the circuits of encoding and decoding have a simple structure, which reduces the complexity of circuit design; and (4) the communication establishment time is short.

DETAILED DESCRIPTION

The technical solutions of the present invention will be further illustrated in detail below with reference to the accompanying drawings to help those skilled in the art understand the technical solutions of the present invention. The technical solutions of the present invention are described below in the order of encoding and decoding.

Encoding Method

Figure 1:
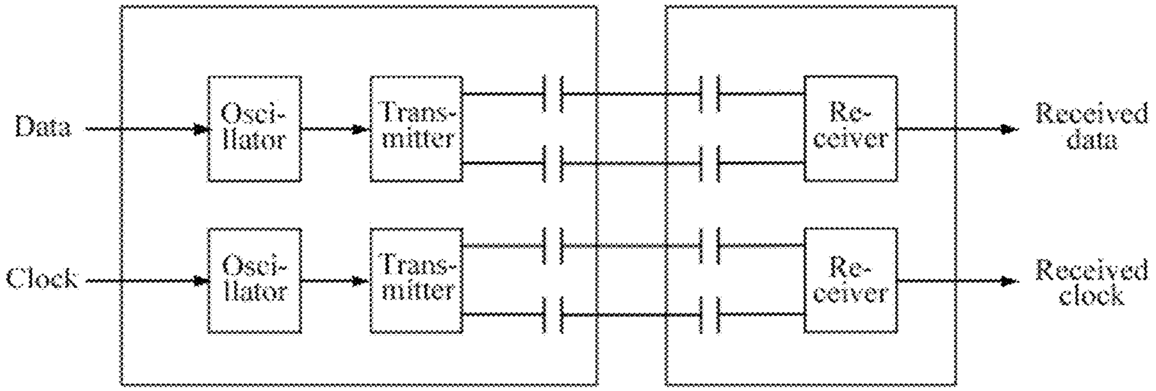
FIG. 1 Prior Art
FIG. 1 is a schematic diagram of a communication circuit in the prior art.
Figure 2:
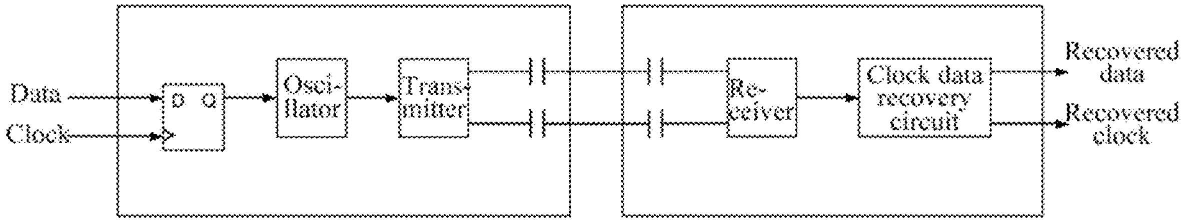
FIG. 2 Prior Art
FIG. 2 is a schematic diagram of another communication circuit in the prior art.
Figure 3:
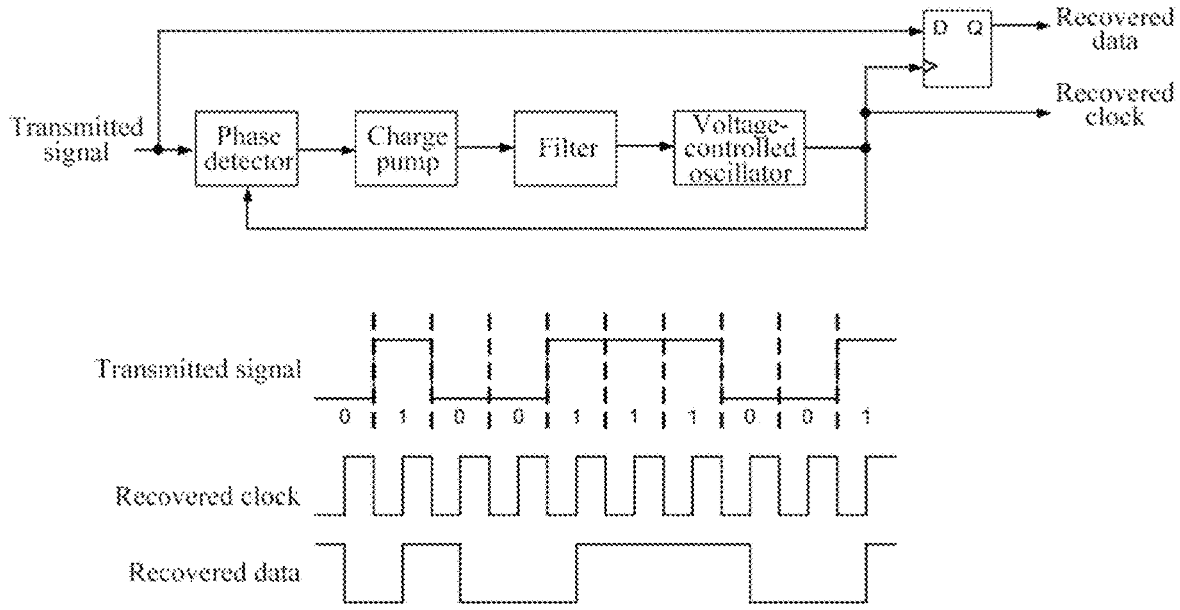
FIG. 3 Prior Art
FIG. 3 is a schematic diagram of a further another communication circuit in the prior art.
Figure 4:
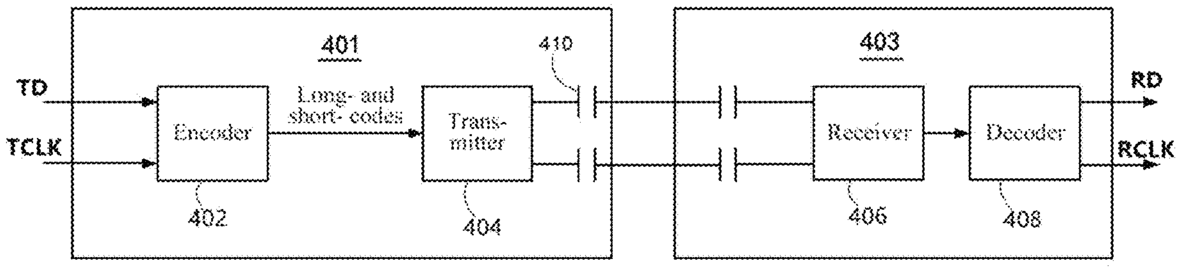
FIG. 4 is a schematic structural diagram of a communication circuit according to the present invention.

Referring to FIG. 4, it is a schematic structural diagram of a communication circuit structure such as a digital isolation chip or an isolation amplification chip.

The communication circuit comprises a primary side 401 and a secondary side 403. The primary side 401 sends communication data, and the secondary side 403 receives communication data.

The primary side 401 comprises an encoder 402 and a transmitter 404, and the secondary side 403 comprises a receiver 406 and a decoder 408.

The transmitter 404 and the receiver 406 are coupled by means of an isolation capacitor 410.

An input terminal of the encoder 402 is configured to receive a data signal TD and a clock signal TCLK, and an output terminal of the decoder 408 outputs a digital signal RD and a clock signal RCLK.

Figure 5:
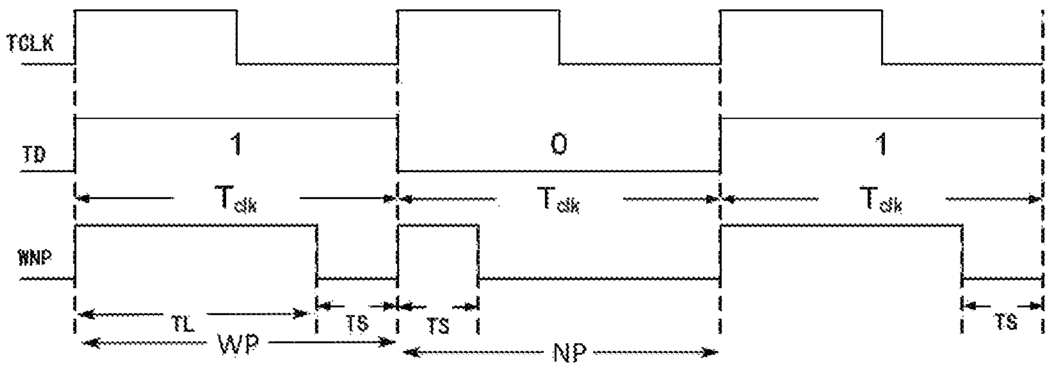
FIG. 5 is a schematic diagram of encoding timing according to the present invention.

FIG. 5 is a schematic diagram of the encoding timing for the data signal TD, the clock signal TCLK and a long- and short-code signal WNP according to the present invention, in which the clock signal TCLK and the data signal TD are combined into one long- and short-code signal WNP by means of an encoding method.

The long- and short-code signal WNP includes a long-code signal WP and a short-code signal NP. The pulse width of the long-code signal WP is consistent with that of the clock signal TCLK, and the pulse width of the short-code signal NP is consistent with that of the clock signal TCLK; and the long-code signal WP and the short-code signal NP have different duty cycles.

The duty cycle of the high and low levels of the long-code signal WP is greater than the duty cycle of the high and low levels of the short-code signal NP. The long-code signal WP is configured to represent that the data signal TD is "1", and the short-code signal NP is configured to indicate that the data signal TD is "0".

The pulse width of the long-code signal WP or the short-code signal NP is one clock period Tclk, and a duty cycle of the long- and short-code signal WNP satisfies a following relational expression: Tclk=TS+TL, where Tclk indicates a clock period, TS indicates a high-level time of the short-code signal NP, TL indicates a high-level time of the long-code signal WP, and TS is not equal to TL. As shown in the figure, the low level of the long-code signal WP has the same pulse width as that of the high level of the short-code signal NP.

With the long- and short-code encoding scheme described above, the data signal TD and the clock signal TCLK are fused for communication, thereby achieving higher efficiency and lower power consumption. Meanwhile, single-channel communication is enabled such that wire bonding for chip packaging can be reduced, thereby reducing the chip manufacturing cost. Moreover, the circuits for encoding and decoding have a simple structure, which reduces the complexity of circuit design.

It should be noted that the present invention essentially differs from the traditional OOK method. In the OOK method, the presence of an oscillation signal (ON) is used to represent 1, and the absence of an oscillation signal (OFF) is used to represent 0. In the present invention, the long- and short-code signals WNP with different duty cycles are transmitted by the OOK method. That is, the high level in the long- and short-code signals WNP is transmitted by ON, and the low level in the long- and short-code signals WNP is transmitted by OFF. That is to say, ON or OFF is used to represent the high or low level, but the content of the data signal TD is represented by different duty cycles of the long- and short-code signals WNP.

Encoding Method I

Figure 6:
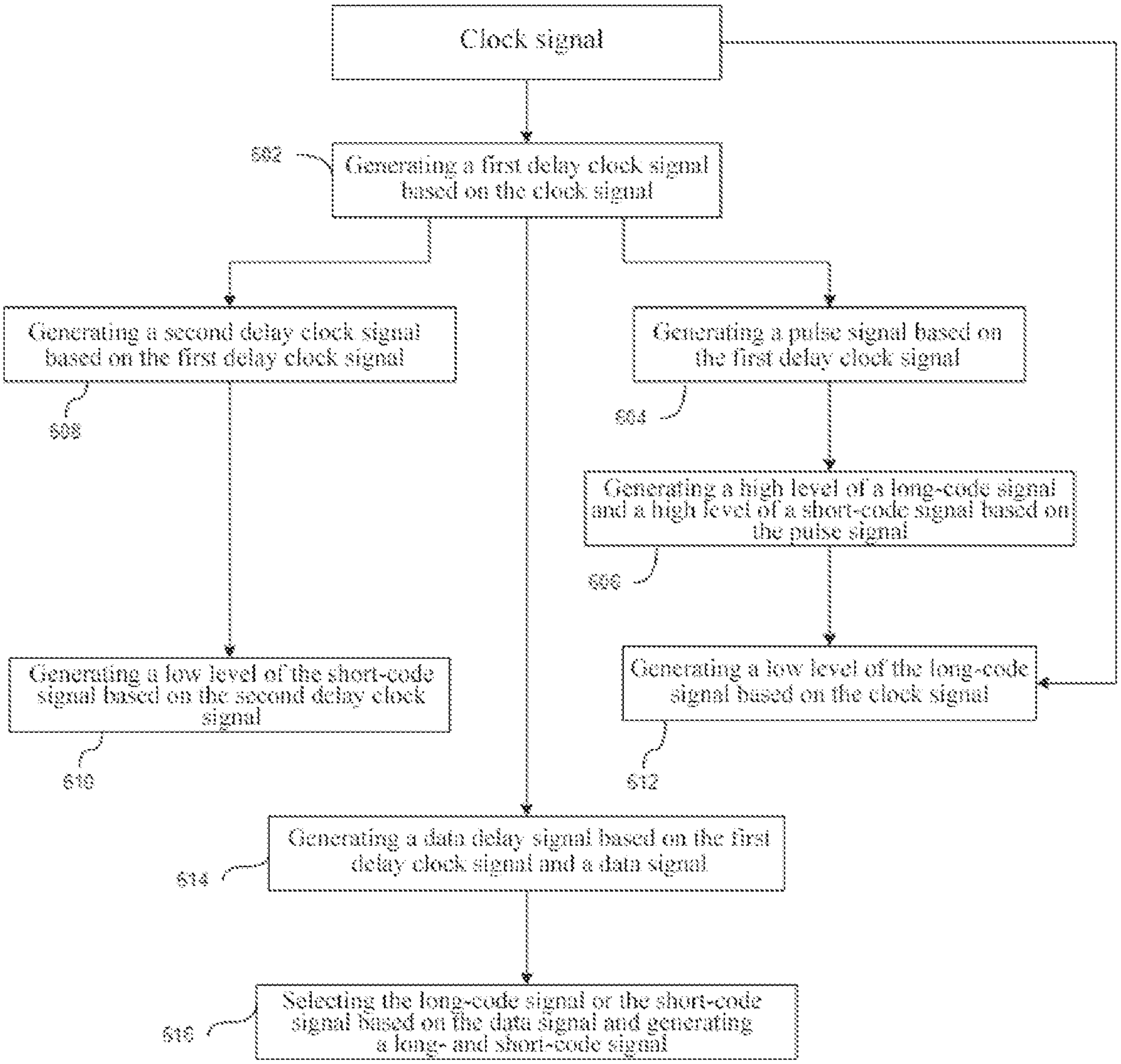
FIG. 6 is a schematic flowchart of an encoding method according to the present invention.

Referring to FIG. 6, it is a schematic flowchart of an encoding method with long and short codes. After a "clock signal" is acquired, the method comprises the following steps:

602: generating a first delay clock signal based on the clock signal;

604: generating a pulse signal based on the first delay clock signal;

606: generating a high level of a long-code signal and a high level of a short-code signal based on the pulse signal;

608: generating a second delay clock signal based on the first delay clock signal;

610: generating a low level of the short-code signal based on the second delay clock signal;

612: generating a low level of the long-code signal based on the clock signal;

614: generating a data delay signal based on the first delay clock signal and a data signal; and

616: selecting the long-code signal or the short-code signal based on the data signal and generating a long- and short-code signal.

Hereinafter, steps 602 to 616 will be further explained in detail in conjunction with the circuit structure shown in FIG. 7 and the timing shown in FIG. 8.

Figure 7:
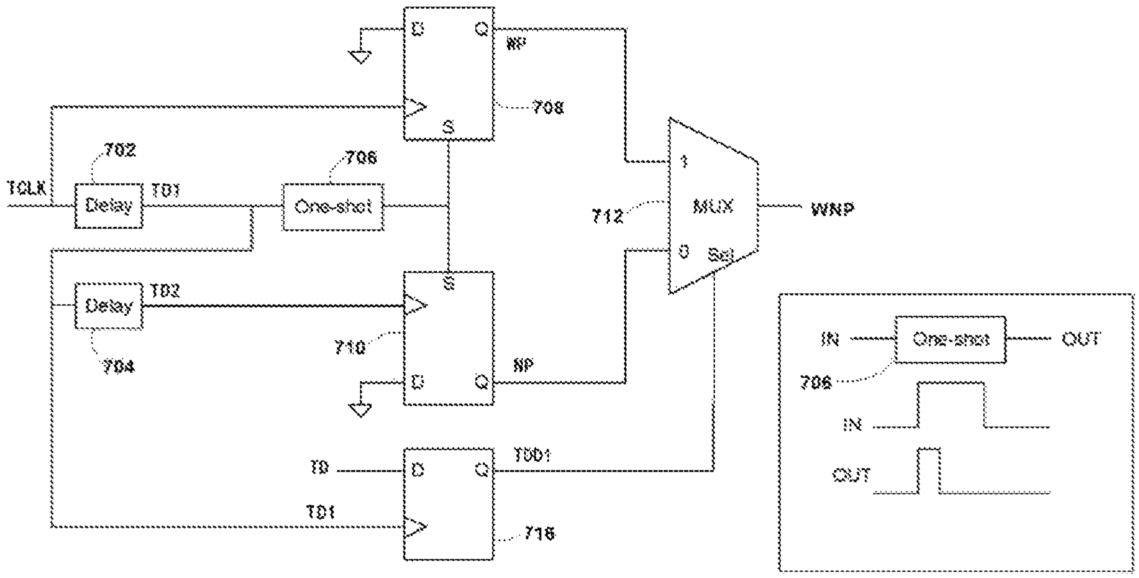
FIG. 7 is a schematic structural diagram of an encoding circuit according to the present invention.

Delay circuits, pulse generators, flip-flops, data selectors and other circuits comprised in FIG. 7 and other drawings are all standard devices, which will not be discussed any more in the present invention and can be implemented by those skilled in the art based on their mastered knowledge.

The clock signal TCLK is coupled to a first delay circuit (Delay) 702; an output terminal of the first delay circuit 702 is coupled to a pulse generator (One-shot) 706; the pulse generator 706 acts according to the timing shown in the lower right of FIG. 7; and an output terminal of the pulse generator 706 is coupled to reset terminals S of a long-code flip-flop 708 and a short-code flip-flop 710. Data terminals D of the long-code flip-flop 708 and the short-code flip-flop 710 are grounded, and output terminals Q of the long-code flip-flop 708 and the short-code flip-flop 710 are coupled to a first input terminal (terminal 1 of a multiplexer (MUX), which is also known as data selector) and a second input terminal (terminal 0 of MUX) of a data selector 712, respectively. An input terminal of a second delay circuit (Delay) 704 is coupled to the output terminal of the first delay circuit 702, and an output terminal of the second delay circuit 704 is coupled to a clock terminal of the short-code flip-flop 710. The output terminal of the first delay circuit 702 is coupled to a clock terminal of a selection flip-flop 716; a data signal TD is coupled to a data terminal D of the selection flip-flop 716; and an output terminal Q of the selection flip-flop 716 is coupled to a selection terminal Sel of the data selector 712. The data selector 712 further comprises an output terminal for outputting long- and short-code signal WNP.

Figure 8:
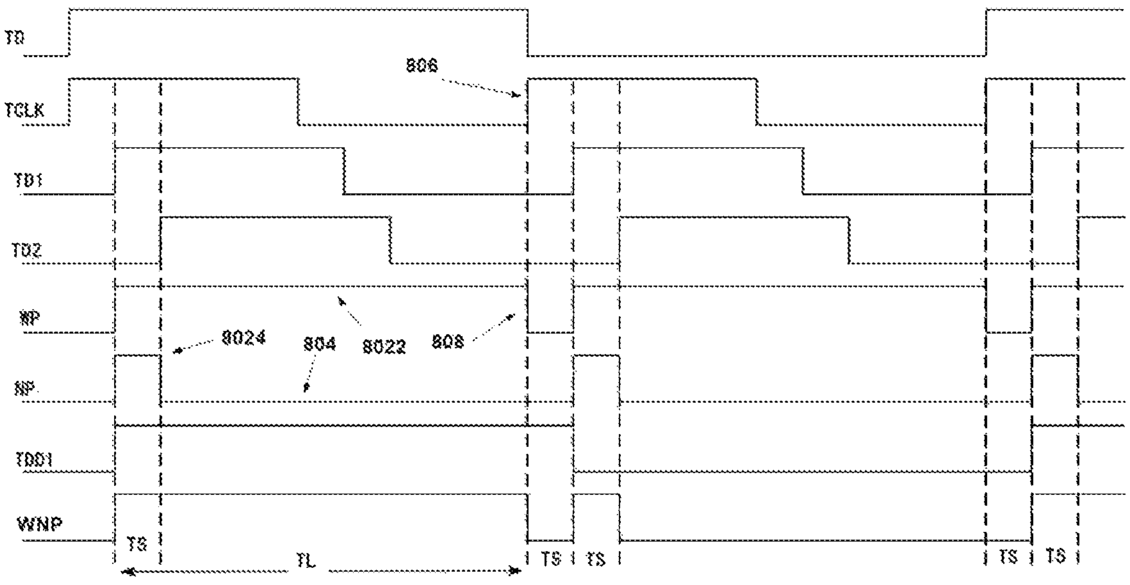
FIG. 8 is a schematic timing diagram of the encoding circuit according to the present invention.

Referring to FIG. 6 to FIG. 8, in step 602, the first delay clock signal TD1 is generated based on the clock signal TCLK.

The first delay circuit 702 generates the first delay clock signal TD1 based on the clock signal TCLK, and a delay time of the first delay clock signal TD1 relative to the clock signal TCLK is TS.

In step 604, the pulse signal is generated based on the first delay clock signal TD1.

A rising edge of the first delay clock signal TD1 triggers the pulse generator 706; the pulse generator 706 generates the pulse signal based on the first delay clock signal TD1; and the pulse signal is sent to the reset terminals S of the long-code flip-flop 708 and the short-code flip-flop 710.

In step 606, the long-code flip-flop 708 and the short-code flip-flop 710 generate a high level 8022 of the long-code signal WP and a high level 8024 of the short-code signal NP based on the pulse signal; and after the pulse signal disappears, the long-code signal WP and short-code signal NP can maintain a high-level state.

In step 608 and step 610, the second delay clock signal TD2 is generated based on the first delay clock signal TD1.

The second delay circuit 704 generates the second delay clock signal TD2 based on the first delay clock signal TD1, and a delay time of the second delay clock signal TD2 relative to the first delay clock signal TD1 is TS.

When a rising edge of the second delay clock signal TD2 appears, the clock terminal of the short-code flip-flop 710 is at a high level, and the short-code flip-flop 710 outputs a low level of the data terminal D which is grounded, thereby generating the low level 804 of the short-code signal NP.

In step 612, the low level 808 of the long-code signal WP is generated based on the clock signal.

When a rising edge 806 appears in a next clock period, the clock terminal of the long-code flip-flop 708 receives the clock signal to trigger the output of the level of the data terminal D which is grounded. At this moment, output signals form the low level 808 of the long-code signal WP.

In step 614, the data delay signal TDD1 is generated based on the first delay clock signal TD1 and the data signal TD.

The first delay clock signal TD1 is later than the clock signal TCLK or the data signal TD by TS, and the data signal TD is synchronized with the clock signal TCLK. Therefore, by taking the first delay clock signal TD1 as a clock source, the data delay signal TDD1 will be generated synchronously when the data signal TD is coupled to the data terminal of the selection flip-flop 716. That is, the delay time of the data delay signal TDD1 relative to the data signal TD is TS.

In step 616, the long-code signal WP or the short-code signal NP is selected based on the data signal TD and the long- and short-code signal WNP is generated.

The data delay signal TDD1 is coupled to the selection terminal Sel of the data selector 712. When the data delay signal TDD1 is at a high level, the long-code signal WP is selected for output, which corresponds to the input signal of the first input terminal in the figure. When the data delay signal TDD1 is at a low level, the short-code signal NP is selected for output, which corresponds to the input signal of the second input terminal in the figure; the data delay signal TDD1 is synchronized with the long- and short-code signal WNP, and based on the data delay signal TDD1, the long-code signal WP or short-code signal NP is selected for output, thereby completing the encoding of the long- and short-code signal WNP.

Encoding Method II

Figure 9:
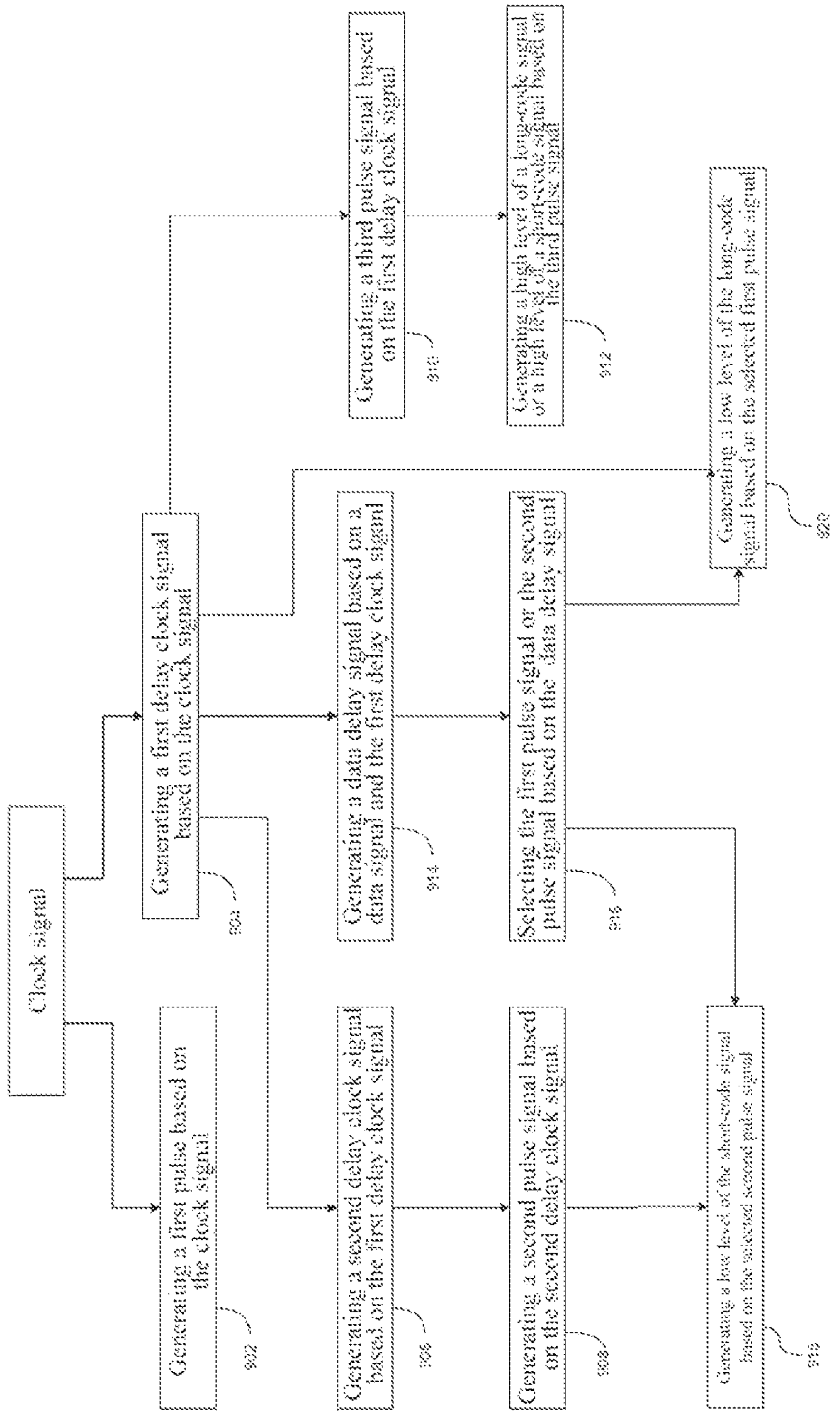
FIG. 9 is a schematic flowchart of another encoding method according to the present invention.

Referring to FIG. 9, the present invention provides another encoding method for single-channel communication. After a "clock signal" is acquired, the method comprises the following steps:

- 902: generating a first pulse signal based on the clock signal;
- 904: generating a first delay clock signal based on the clock signal;
- 906: generating a second delay clock signal based on the first delay clock signal;
- 908: generating a second pulse signal based on the second delay clock signal;
- 910: generating a third pulse signal based on the first delay clock signal;
- 912: generating a high level of a long-code signal or a high level of a short-code signal based on the third pulse signal;
- 914: generating a data delay signal based on a data signal and the first delay clock signal;
- 916: selecting the first pulse signal or the second pulse signal based on the data delay signal;
- 918: generating a low level of the short-code signal based on the selected second pulse signal; and
- 920: generating a low level of the long-code signal based on the selected first pulse signal.

Steps 902 to 920 will be further explained in detail below in conjunction with the circuit structure shown in FIG. 10 and the timing diagram shown in FIG. 11.

Figure 10:
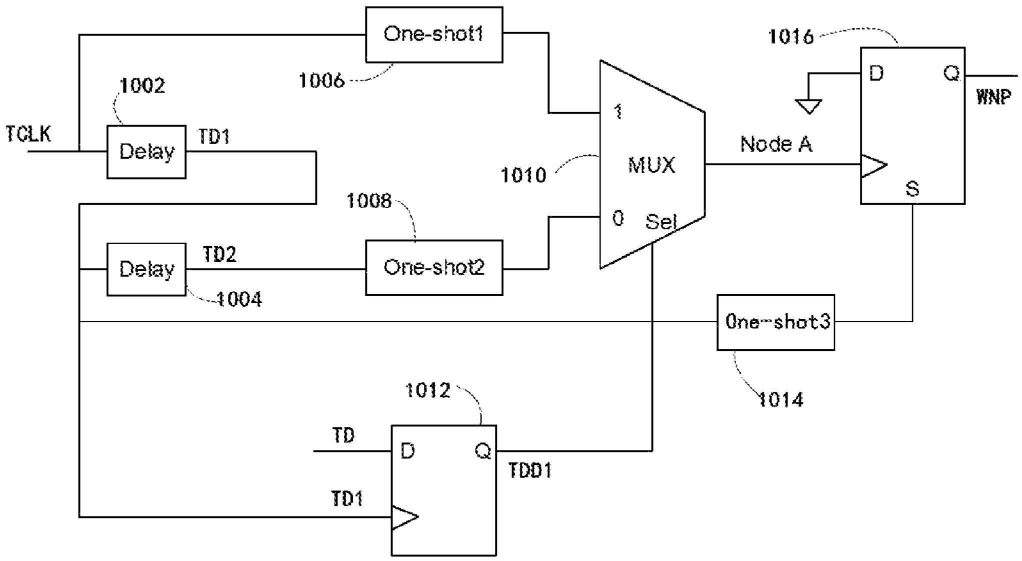
FIG. 10 is a schematic structural diagram of another circuit according to the present invention.

Referring to FIG. 10, a circuit for encoding comprises a first delay circuit (Delay) 1002, a second delay circuit (Delay) 1004, a first pulse generator (One-shot1) 1006, a second pulse generator (One-shot2) 1008, a third pulse generator (One-shot3) 1014, a data selector (MUX) 1010, a selection flip-flop 1012, and an output flip-flop 1016.

The clock signal TCLK is coupled to the first delay circuit 1002 and the first pulse generator 1006.

An output terminal of the first delay circuit 1002 is coupled to an input terminal of the second delay circuit 1004; an output terminal of the second delay circuit 1004 is coupled to an input terminal of the second pulse generator 1008; and an output terminal of the second pulse generator 1008 is coupled to a second input terminal (terminal 0 of MUX) of the data selector 1010.

An output terminal of the first pulse generator 1006 is coupled to a first input terminal (terminal 1 of MUX) of the data selector 1010; the data signal TD is coupled to a data input terminal D of the selection flip-flop 1012; an output terminal Q of the selection flip-flop 1012 is coupled to a selection terminal Sel of the data selector 1010 (that is, the selection terminal Sel of the data selector 1010 is coupled to the data delay signal TDD1); an output terminal of the third pulse generator 1014 is coupled to a reset terminal S of the output flip-flop 1016; and a clock terminal of the output flip-flop 1016 is coupled to an output terminal of the data selector 1010 to form a node A (Node A). The output flip-flop 1016 further comprises a grounded data terminal D and an output terminal Q for outputting a long- and short-code signal WNP.

Figure 11:
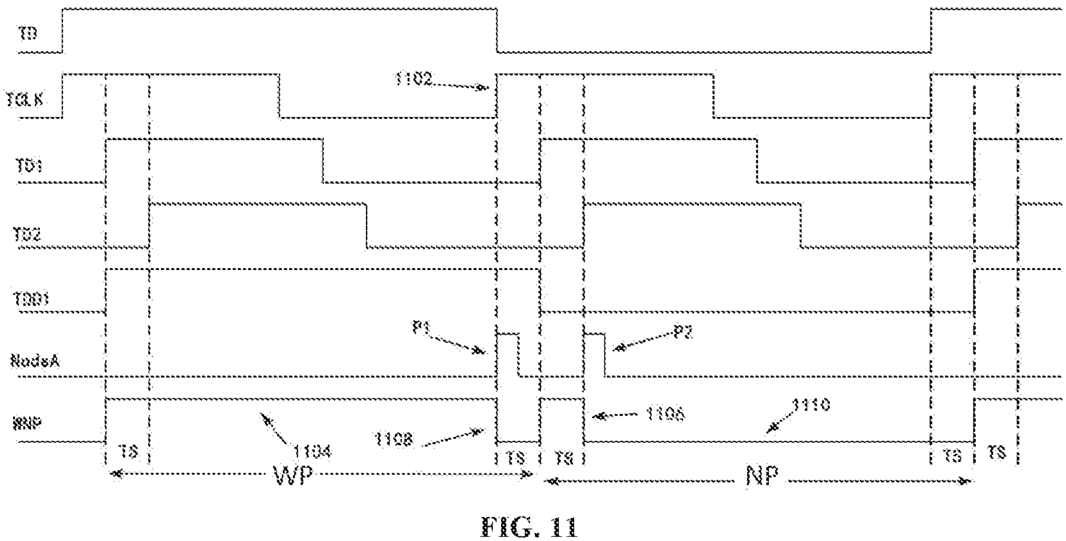
FIG. 11 is a schematic timing diagram of another circuit according to the present invention.

Referring to FIG. 9 to FIG. 11, in step 902, the first pulse signal P1 is generated at the node A (Node A) based on the clock signal TCLK; a rising edge 1102 of the clock signal triggers the first pulse generator 1006; and based on the first delay clock signal (i.e., the rising edge 1102), the first pulse generator 1006 generates the first pulse signal P1 which is input to the first input terminal of the data selector 1010.

In step 904, the first delay clock signal TD1 is generated based on the clock signal TCLK.

The first delay circuit 1002 generates the first delay clock signal TD1 based on the clock signal TCLK. The first delay clock signal TD1 serves as the basis of the second delay clock signal TD2, and a delay time of the first delay clock signal TD1 relative to the clock signal is TS.

In step 906, the second delay clock signal TD2 is generated based on the first delay clock signal TD1.

The second delay circuit 1004 generates the second delay clock signal TD2 based on the first delay signal TD1, and a delay time of the second delay clock signal TD2 relative to the first delay clock signal TD1 is TS.

In step 908, the second pulse signal P2 is generated based on the second delay clock signal TD2. The second pulse generator 1008 generates the second pulse signal P2 based on the second delay clock signal TD2, and the second pulse signal P2 is configured to allow the output flip-flop 1016 to output a low level.

In step 910: the third pulse signal is generated based on the first delay clock signal TD1.

The third pulse generator 1014 generates the third pulse signal based on the first delay clock signal TD1.

In step 912, the third pulse signal resets the output flip-flop 1016 to generate the high level 1104 of the long-code signal WP or the high level 1106 of the short-code signal NP (the long-code signal WP and the short-code signal NP are recorded in the long- and short-code signal WNP).

In step 914, the data delay signal TDD1 is generated based on the data signal TD and the first delay clock signal TD1.

For the selection flip-flop 1012, a clock terminal receives the first delay clock signal TD1, a data terminal D is coupled to a data signal TD, and an output terminal Q outputs a data delay signal TDD1, which is synchronized with the first delay clock signal TD1.

In step 916, the first pulse signal P1 or the second pulse signal P2 are selected based on the data delay signal TDD1.

The data selector 1012 selects the first pulse signal P1 or the second pulse signal P2 based on the data delay signal TDD1. When the data delay signal TDD1 is at a high level, the data selector 1012 outputs the first pulse signal P1; and when the data delay signal TDD1 is at a low level, the data selector 1012 outputs the second pulse signal P2.

In step 920, the low level 1108 of the long-code signal WP is generated based on the selected first pulse signal P1.

The rising edge of the first pulse signal P1 is aligned with the rising edge of the clock signal TCLK. Therefore, the first pulse signal P1 causes the output flip-flop 1016 to generate the low level 1108 of the long-code signal WP, and then, the third pulse generator 1014 generates a pulse signal to pull up an output level of the output flip-flop 1016 again to form the high level 1104 of the long-code signal WP, thereby completing one long-code encoding.

In step 918, the low level 1110 of the short-code signal NP is generated based on the selected second pulse signal P2.

The delay time of the rising edge of the second pulse signal P2 relative to the first delay clock signal TD1 is TS. After the high level of the output flip-flop 1016 lasts for the delay time TS, the output level of the output flip-flop 1016 is pulled down by the second pulse signal P2 to form the low level 1110 of the short-code signal NP; and then after the rising edge of the first delay clock signal TD1 appears, the third pulse generator 1014 generates a pulse signal to pull up the output level of the output flip-flop 1016 again to form the high level 1106 of the short-code signal NP, thereby completing one short-code encoding.

Decoding Method

Figure 12:
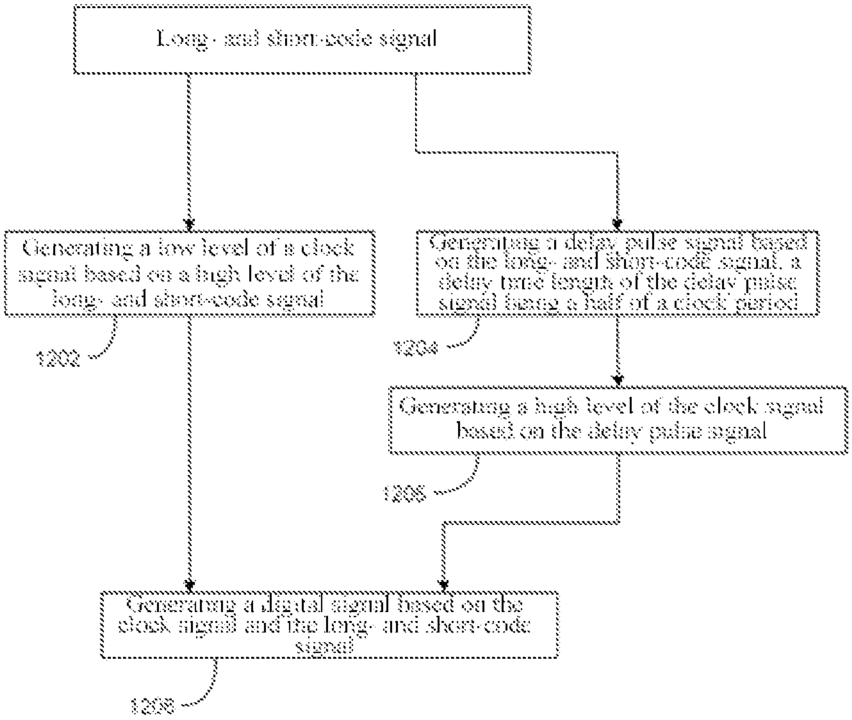
FIG. 12 is a schematic flowchart of a decoding method according to the present invention.

Referring to FIG. 12, the decoding method for single-channel communication comprises the following steps after a "long- and short-code signal" is acquired:

- 1202: generating a low level of a clock signal based on a high level of the long- and short-code signal;
- 1204: generating a delay pulse signal based on the long- and short-code signal, a delay time length of the delay pulse signal being a half of a clock period;
- 1206: generating a high level of the clock signal based on the delay pulse signal; and
- 1208: generating a digital signal based on the clock signal and the long- and short-code signal.

Hereinafter, steps 1202 to 1208 will be further explained in detail in conjunction with the circuit structure shown in FIG. 13 and the timing diagram shown in FIG. 14.

Figure 13:
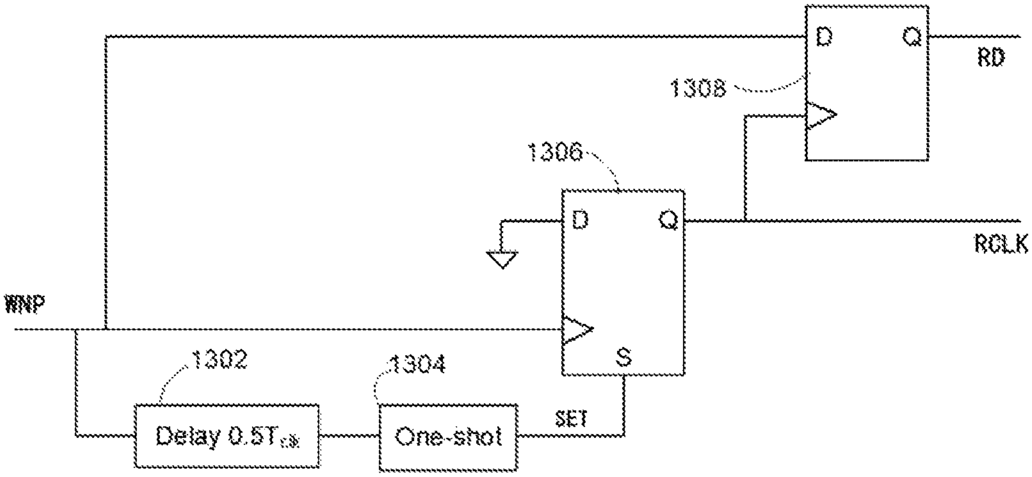
FIG. 13 is a schematic structural diagram of a decoding circuit according to the present invention.

Referring to FIG. 13, the circuit structure comprises a delay pulse circuit (Delay 0.5 Tclk) 1302, a pulse generator (One-shot) 1304, a clock flip-flop 1306, and a digital signal flip-flop 1308.

The delay pulse circuit 1302 is coupled to the long- and short-code signal WNP; an output terminal of the delay pulse circuit 1302 is coupled to the pulse generator 1304; and a data terminal D of the digital signal flip-flop 1308 is coupled to the long- and short-code signal WNP. A clock terminal of the clock flip-flop 1306 is coupled to the long- and short-code signal WNP; a reset terminal S of the clock flip-flop 1306 is coupled to an output terminal of the pulse generator 1304 to receive a delay pulse signal SET; and an output terminal Q of the clock flip-flop 1306 is coupled to a clock terminal of the digital signal flip-flop 1308 to output the clock signal RCLK. The clock flip-flop 1306 further comprises a grounded data terminal D, and the digital signal flip-flop 1308 further comprises an output terminal Q for outputting a digital signal RD.

Figure 14:
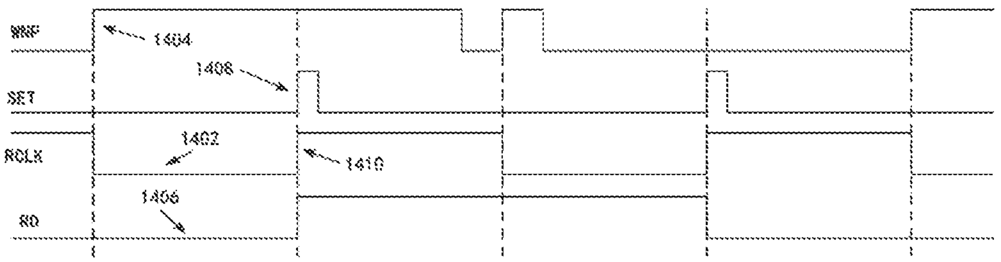
FIG. 14 is a schematic timing diagram of the decoding circuit according to the present invention.

Referring to FIG. 12 to FIG. 14, in step 1202, the low level 1402 of the clock signal RCLK is generated based on the high level of the long- and short-code signal WNP.

After a rising edge 1404 of the long- and short-code signal WNP is input to the clock flip-flop 1306, the output terminal Q of the clock flip-flop 1306 outputs a low level 1402 (included in the clock signal RCLK) of the data terminal D.

That is, the clock flip-flop 1306 generates the low level of the clock signal RCLK based on the long- and short-code signal WNP.

In step 1204, the delay pulse signal SET is generated based on the long- and short-code signal WNP. A delay time of the delay pulse signal SET is half a clock period (0.5 Tclk).

The delay pulse circuit 1302 delays the long- and short-code signal WNP by half a clock period and generates a long- and short-code delay signal, and the pulse generator 1304 generates the delay pulse signal SET based on the long- and short-code delay signal. In other words, a time length between a rising edge 1408 of the delay pulse signal SET and the rising edge 1404 of the long- and short-code signal WNP is half a clock period.

In step 1206, the delay pulse signal SET resets the output terminal Q of the clock flip-flop 1306 to allow the output terminal Q to output a high level, which constitutes the high level of the clock signal RCLK.

Steps 1202 to 1206 are repeated to generate a plurality of clock signals RCLK.

In step 1208, the digital signal RD is generated based on the clock signal RCLK and the long- and short-code signal WNP.

According to the clock signal RCLK, the digital signal flip-flop 1308 generates a digital high level or a digital low level 1406 included in the digital signal RD.

Since a rising edge 1410 of the clock signal RCLK is exactly in the middle position (half a period) of the data signal, the output signal of the digital signal flip-flop 1308 is the high level of the long-code signal WP or the low level of the short-code signal NP, such that the output decoded high-and-low-level signals exactly correspond to the encoding of the long- and short-code signal WNP.

As a further improvement on the method described above, generating the delay pulse signal SET based on the long- and short-code signal WNP further comprises: generating a long- and short-code delay signal based on the long- and short-code signal WNP, and controlling a delay time of the long- and short-code signal WNP based on a phase difference between the long- and short-code delay signal and the long- and short-code signal WNP.

As a further improvement on the method described above, controlling the delay time of the long- and short-code signal WNP based on the phase difference between the long- and short-code delay signal and the long- and short-code signal WNP further comprises: converting a phase difference signal corresponding to the phase difference to a voltage signal, and controlling the delay time of the long- and short-code delay signal based on the voltage signal.

Figure 15:
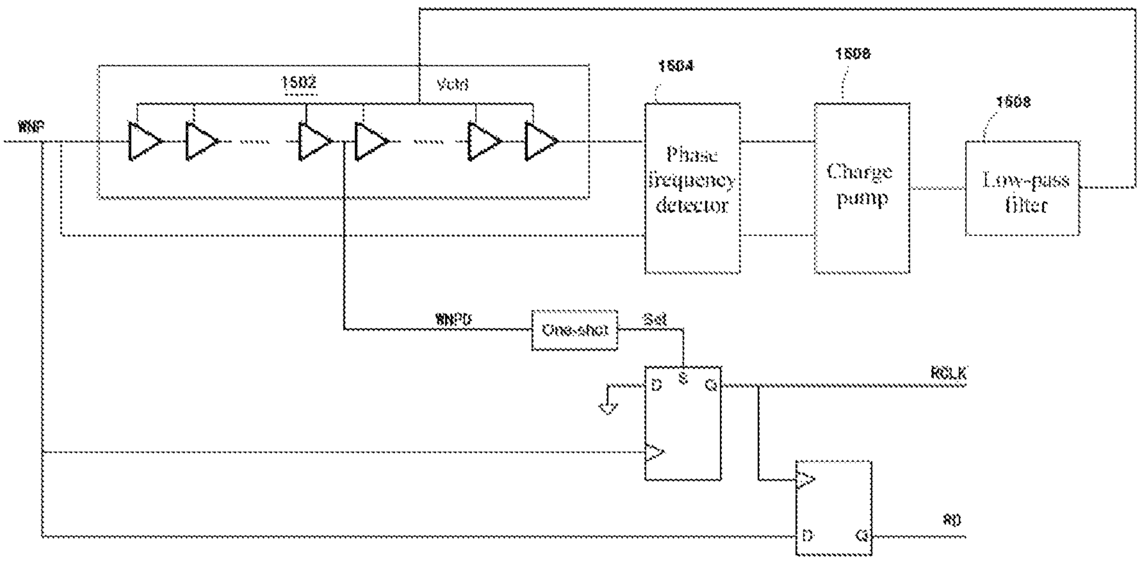
FIG. 15 is a schematic structural diagram of a decoding circuit according to the present invention, in which a delay circuit is comprised.

Referring to FIG. 15, a decoding circuit for single-channel communication is shown to comprise an internal structure of a delay circuit of the delay pulse circuit 1302 in FIG. 13, and the delay pulse circuit 1302 may further comprise a pulse circuit.

Specifically, the delay pulse circuit comprises: an intermediate stage 1502 of a delay circuit configured to convert the long- and short-code signal WNP to a long- and short-code delay signal WNPD; a phase-frequency detector 1504 configured to detect a phase difference between the long- and short-code delay signal WNPD and the long- and short-code signal WNP; a charge pump 1506 configured to convert the phase difference to a current signal; and a low-pass filter 1508 configured to convert the current signal to a voltage signal Vctrl. The intermediate stage 1502 of the delay circuit is coupled to an output terminal of the low-pass filter 1508, and is configured to receive the voltage signal Vctrl and control the delay time of the long- and short-code delay signal WNPD.

The above-mentioned feedback loop formed by the phase-frequency detector 1504 to the low-pass filter 1508 from the phase signal to the voltage signal can accurately control the time of the delay circuit, such that the delay time of the delay circuit is controlled to be more precise, and the accurate clock signal RCLK can be restored in conjunction with the rest of the decoding circuit.

Similar to the circuit in FIG. 13, the rest comprises a pulse generator One-shot, a clock flip-flop, and a digital signal flip-flop. An input terminal of the pulse generator One-shot is coupled to the long- and short-code delay signal WNPD, and an output terminal of the pulse generator One-shot is coupled to a reset terminal S of the clock flip-flop and outputs a delay pulse signal Set. For the clock flip-flop, a data terminal D is grounded, a clock terminal is coupled to the long- and short-code signal WNP, and the clock signal RCLK is output by means of an output terminal Q. For the digital signal flip-flop, a clock terminal is coupled to the output terminal Q of the clock flip-flop, a data terminal D is coupled to the long- and short-code signal WNP, and an output terminal Q outputs the digital signal RD.

Figure 16:
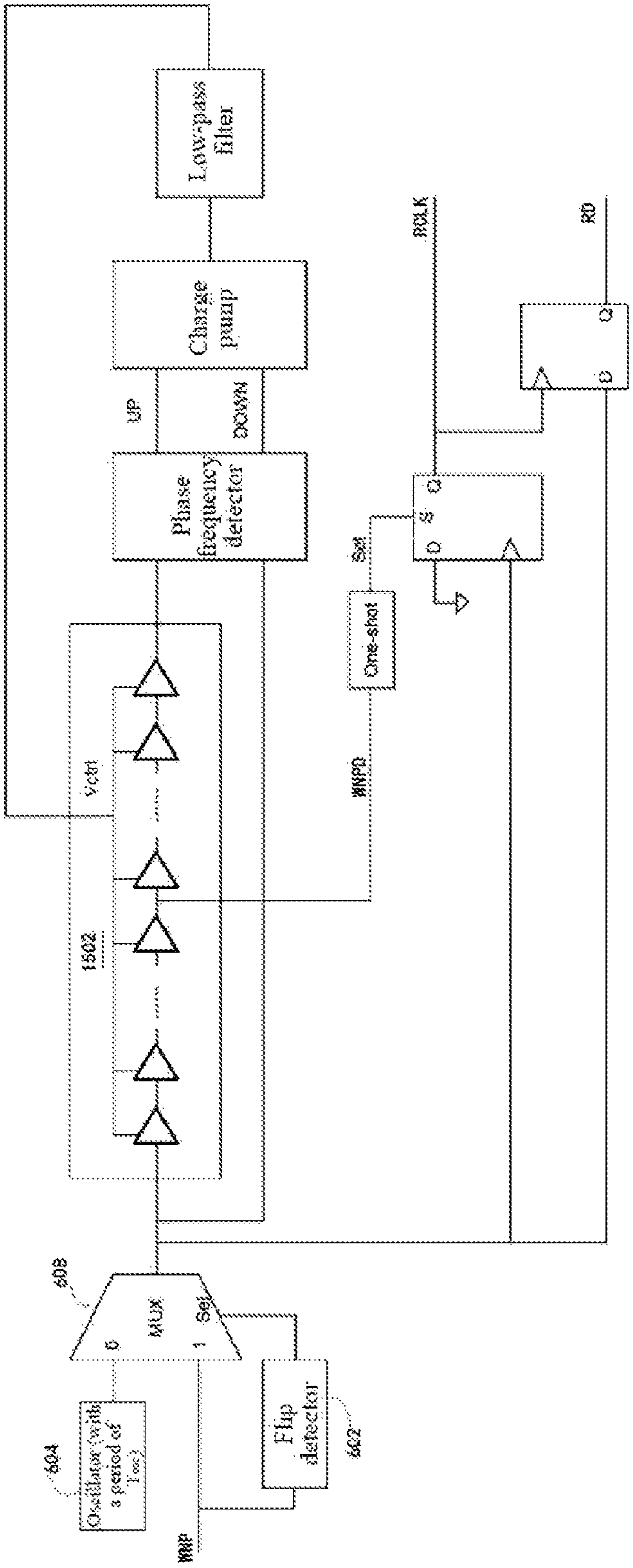
FIG. 16 is a schematic structural diagram of a decoding circuit according to the present invention, in which a circuit for pre-establishing a control voltage is comprised.

Referring to FIG. 16, a circuit for pre-establishing a control voltage is further added on the basis of FIG. 15. The circuit comprises a flip detector 602, an oscillator 604 (with a period of Tosc), and a data selector (MUX) 608. The oscillator 604 is coupled to a second input terminal (terminal 0 of MUX) of the data selector 608; the long- and short-code signal WNP is accessed to a first input terminal (terminal 1 of the MUX) of the data selector 608 and an input terminal of the flip detector 602; and an output terminal of the flip detector 602 is coupled to a selection terminal Sel of the data selector 608. The long- and short-code signal WNP input of the circuit in FIG. 15 is replaced with an output terminal of the data selector 608.

When no communication occurs, the flip detector 602 outputs a low level, and the data selector 608 couples an output of the oscillator 604 to a delay-locked loop (comprising a circuit formed by the intermediate stage 1502 of the delay circuit, the phase-frequency detector, the charge pump, and the low-pass filter, at a back side), and establishes a voltage signal Vctrl.

When communication occurs, the flip detector 602 outputs a high level, and the data selector 608 couples the long- and short-code signal WNP to the delay pulse circuit.

Similar to the circuit in FIG. 15, the rest of the circuit comprises a pulse generator One-shot, a clock flip-flop, and a digital signal flip-flop. For the pulse generator One-shot, an input terminal is coupled to the long- and short-code delay signal WNPD, and an output terminal is coupled to a reset terminal S of the clock flip-flop and outputs a delay pulse signal Set. For the clock flip-flop, a data terminal D is grounded, a clock terminal is coupled to the long- and short-code signal WNP, and a clock signal RCLK is output by means of an output terminal Q. For the digital signal flip-flop, a clock terminal is coupled to the output terminal Q of the clock flip-flop, a data terminal D is coupled to the long- and short-code signal WNP, and an output terminal Q outputs the digital signal RD.

Meanwhile, the phase-frequency detector is coupled to the charge pump by means of two output terminals to output control signals UP and DOWN.

When no communication occurs, the delay-locked loop has established a voltage signal Vctrl of a voltage-controlled delay line (comprising the intermediate stage 1502 of the delay circuit), and the voltage signal Vctrl approaches a final voltage signal during communication. Therefore, once the long- and short-code signal WNP arrives, accurate communication can be implemented immediately, without the establishment time required by a general clock data recovery circuit, thereby achieving rapid establishment of communication.

The technical content and technical features of the present invention have been disclosed as above, and those skilled in the art can still make various substitutions and modifications based on the teaching and disclosure of the present invention without departing from the spirit of the present invention. Therefore, the scope of protection of the present invention is not limited to the content disclosed in the embodiments, and should include various substitutions and modifications that do not depart from the present invention, and be covered by the claims of the present patent application.

What is claimed is:

1. An encoding method for single-channel communication, comprising:

combining a clock signal and a data signal into a long- and short-code signal, wherein the long- and short-code signal comprises a long-code signal and a short-code signal, a pulse width of the long-code signal is consistent with that of the clock signal, and a pulse width of the short-code signal is consistent with that of the clock signal; and the long-code signal and the short-code signal have different duty cycles, wherein combining a clock signal and a data signal into a long- and short-code signal comprises:

generating a high level of the long- and short-code signal based on the clock signal;

generating a second delay clock signal based on the clock signal;

generating a low level of the long- and short-code signal based on the second delay clock signal and the clock signal;

generating the long- and short-code signal based on the clock signal and the data signal.

2. The encoding method for single-channel communication according to claim 1, wherein a duty cycle of the long- and short-code signal satisfies a following relational expression: Tclk=TS+TL, wherein Tclk indicates a clock period, TS indicates a high-level time of the short-code signal, TL indicates a high-level time of the long-code signal, and TS is not equal to TL.

3. The encoding method for single-channel communication according to claim 2, wherein combining the clock signal and the data signal into the long- and short-code signal comprises:

generating a first delay clock signal based on the clock signal;

generating a pulse signal based on the first delay clock signal;

generating a high level of the long-code signal and a high level of the short-code signal based on the pulse signal;

generating a second delay clock signal based on the first delay clock signal;

generating a low level of the short-code signal based on the second delay clock signal;

generating a low level of the long-code signal based on the clock signal;

generating a data delay signal based on the first delay clock signal and the data signal; and selecting the long-code signal or the short-code signal based on the data signal and generating the long- and short-code signal.

4. The encoding method for single-channel communication according to claim 3, wherein a delay time of the first delay clock signal relative to the clock signal is TS; a delay time of the second delay clock signal relative to the first delay clock signal is TS; and a delay time of the data delay signal relative to the data signal is TS.

5. The encoding method for single-channel communication according to claim 2, wherein combining the clock signal and the data signal into the long- and short-code signal comprises:

generating a first pulse signal based on the clock signal;

generating a first delay clock signal based on the clock signal;

generating a second delay clock signal based on the first delay clock signal;

generating a second pulse signal based on the second delay clock signal;

generating a third pulse signal based on the first delay clock signal;

generating a high level of the long-code signal or a high level of the short-code signal based on the third pulse signal;

generating a data delay signal based on the data signal and the first delay clock signal;

selecting the first pulse signal or the second pulse signal based on the data delay signal;

generating a low level of the short-code signal based on the selected second pulse signal; and generating a low level of the long-code signal based on the selected first pulse signal.

6. A decoding method for single-channel communication, comprising:

obtaining a long- and short-code signal based on an encoding method for single-channel communication according to claim 1;

generating a low level of a clock signal based on a high level of a long- and short-code signal;

generating a delay pulse signal based on the long- and short-code signal, a delay time length of the delay pulse signal being a half of a clock period;

generating a high level of the clock signal based on the delay pulse signal; and generating a digital signal based on the clock signal and the long- and short-code signal.

7. The decoding method for single-channel communication according to claim 6, wherein generating the delay pulse signal based on the long- and short-code signal further comprises: generating a long- and short-code delay signal based on the long- and short-code signal, and controlling a delay time of the long- and short-code signal based on a phase difference between the long- and short-code delay signal and the long- and short-code signal.

8. The decoding method for single-channel communication according to claim 7, wherein controlling the delay time of the long- and short-code signal based on the phase difference between the long- and short-code delay signal and the long- and short-code signal further comprises: converting a signal of the phase difference to a voltage signal, and controlling the delay time of the long- and short-code delay signal based on the voltage signal.

9. An encoding circuit for single-channel communication, comprising:

a selection flip-flop and a data selector, configured to generate a long- and short-code signal based on a clock signal and a data signal into, wherein the long- and short-code signal comprises a long-code signal and a short-code signal, a pulse width of the long-code signal is consistent with that of the clock signal, and a pulse width of the short-code signal is consistent with that of the clock signal; and the long-code signal and the short-code signal have different duty cycles.

10. The encoding circuit for single-channel communication according to claim 9, comprising:

a flip-flop, configured to generate a high level of the long- and short-code signal based on the clock signal and to generate a low level of the long- and short-code signal based on a second delay clock signal and the clock signal, wherein the flip-flop comprises an output flip-flop or comprises a long-code flip-flop and a short-code flip-flop;

a delay circuit and a pulse generator, configured to generate the second delay clock signal based on the clock signal, wherein the delay circuit comprises a first delay circuit and a second delay circuit.

11. The encoding circuit for single-channel communication according to claim 10, comprising:

a first delay circuit configured to generate a first delay clock signal based on a clock signal;

a pulse generator configured to generate a pulse signal based on the first delay clock signal;

a long-code flip-flop, which has a reset terminal for receiving the pulse signal and outputting a high level of a long-code signal, and has a clock terminal for receiving the clock signal, the clock signal triggering an output of a low level of a long-code signal;

a short-code flip-flop, which has a reset terminal for receiving the pulse signal and outputting a high level of a short-code signal;

a second delay circuit configured to generate a second delay clock signal based on the first delay clock signal, a clock terminal of the short-code flip-flop for receiving the second delay clock signal and outputting a low level of the short-code signal;

a selection flip-flop, which has a clock terminal for receiving the first delay clock signal, a data terminal coupled to a data signal, and an output terminal for outputting a data delay signal; and a data selector, which has a first input terminal coupled to an output terminal of the long-code flip-flop, a second input terminal coupled to an output terminal of the short-code flip-flop, and a selection terminal coupled to the output terminal of the selection flip-flop, the data selector selecting and outputting the long-code signal or the short-code signal based on the data delay signal to form a long- and short-code signal.

12. The encoding circuit for single-channel communication according to claim 10, comprising:

a first delay circuit configured to generate a first delay clock signal based on a clock signal;

a second delay circuit configured to generate a second delay clock signal based on the first delay clock signal;

a first pulse generator configured to generate a first pulse signal based on the first delay clock signal;

a second pulse generator configured to generate a second pulse signal based on the second delay clock signal;

a third pulse generator configured to generate a third pulse signal based on the first delay clock signal;

a selection flip-flop, which has a clock terminal for receiving the first delay clock signal, a data terminal coupled to a data signal, and an output terminal for outputting a data delay signal;

a data selector, which has a first input terminal coupled to the first pulse generator, a second input terminal coupled to the second pulse generator, and a selection terminal coupled to the data delay signal and selecting the first pulse signal or the second pulse signal based on the data delay signal; and an output flip-flop, which has a reset terminal coupled to the third pulse generator, and a clock terminal coupled to an output terminal of the data selector, wherein the output flip-flop generates a high level of a long-code signal or a high level of a short-code signal based on the third pulse signal, the clock terminal receives the first pulse signal and generates a low level of the long-code signal, and the clock terminal receives the second pulse signal and generates a low level of the short-code signal.

13. A decoding circuit for single-channel communication, comprising:

a delay pulse circuit configured to delay a long- and short-code signal by half a clock period and generate a long- and short-code delay signal, wherein the long- and short-code delay signal is generated by an encoding circuit for single-channel communication according to claim 9;

a pulse generator configured to generate a delay pulse signal based on the long- and short-code delay signal;

a clock flip-flop, configured to generate a high level of a clock signal based on the delay pulse signal;

a digital signal flip-flop, configured to generate a digital high level or a digital low level based on the clock signal.

14. The decoding circuit for single-channel communication according to claim 13, wherein a clock terminal of the clock flip-flop is coupled to the long- and short-code signal and generate a low level of a clock signal based on the long- and short-code signal, and a reset terminal of the clock flip-flop is coupled to an output terminal of the pulse generator; and a clock terminal of the digital signal flip-flop is coupled to an output terminal of the clock flip-flop, and a data terminal of the digital signal flip-flop is coupled to the long- and short-code signal.

15. The decoding circuit for single-channel communication according to claim 13, wherein a data terminal of the clock flip-flop is grounded; and the output terminal of the clock flip-flop is configured to output a low level of the data terminal of the clock flip-flop included in the clock signal after a rising edge of the long- and short-code signal is input to the clock flip-flop.

16. The decoding circuit for single-channel communication according to claim 13, an output terminal of the digital signal flip-flop is configured to output a digital signal, and an output signal of the digital signal flip-flop is a high level of a long-code signal or a low level of a short-code signal.

17. The decoding circuit for single-channel communication according to claim 13, wherein the delay pulse circuit comprises a delay circuit, wherein the delay circuit comprises:

an intermediate stage of the delay circuit for converting the long- and short-code signal to the long- and short-code delay signal;

a phase-frequency detector configured to detect a phase difference between the long- and short-code delay signal and the long- and short-code signal;

a charge pump configured to convert the phase difference to a current signal; and a low-pass filter configured to convert the current signal to a voltage signal, wherein the intermediate stage of the delay circuit is coupled to the low-pass filter, and configured to receive the voltage signal and control a delay time of the long- and short-code delay signal.

18. The decoding circuit for single-channel communication according to claim 17, wherein the decoding circuit further comprises a flip detector, an oscillator, and a data selector, wherein when no communication occurs, the flip detector outputs a low level, and the data selector couples an output of the oscillator to a delay-locked loop, and establishes a voltage signal; and when communication occurs, the flip detector outputs a high level, and the data selector couples the long- and short-code signal to the delay pulse circuit.

19. The decoding circuit for single-channel communication according to claim 18, wherein the oscillator is coupled to a second input terminal of the data selector; the long- and short-code signal is accessed to a first input terminal of the data selector and an input terminal of the flip detector; and an output terminal of the flip detector is coupled to a selection terminal of the data selector;

the delay-locked loop comprises a circuit formed by the intermediate stage of the delay circuit, the phase-frequency detector, the charge pump, and the low-pass filter, at a back side;

the delay-locked loop is configured to establish a voltage signal of a voltage-controlled delay line comprising the intermediate stage of the delay circuit, and the voltage signal approaches a final voltage signal during communication; and the phase-frequency detector is coupled to the charge pump by means of two output terminals to output control signals UP and DOWN.

20. The decoding circuit for single-channel communication according to claim 19, wherein the second input terminal of the data selector is a terminal 0 of the data selector and the first input terminal of the data selector is a terminal 1 of the data selector.

* * * * *